April 26, 1938.  C. C. FARMER  2,115,551
FLUID PRESSURE BRAKE
Filed Sept. 14, 1935
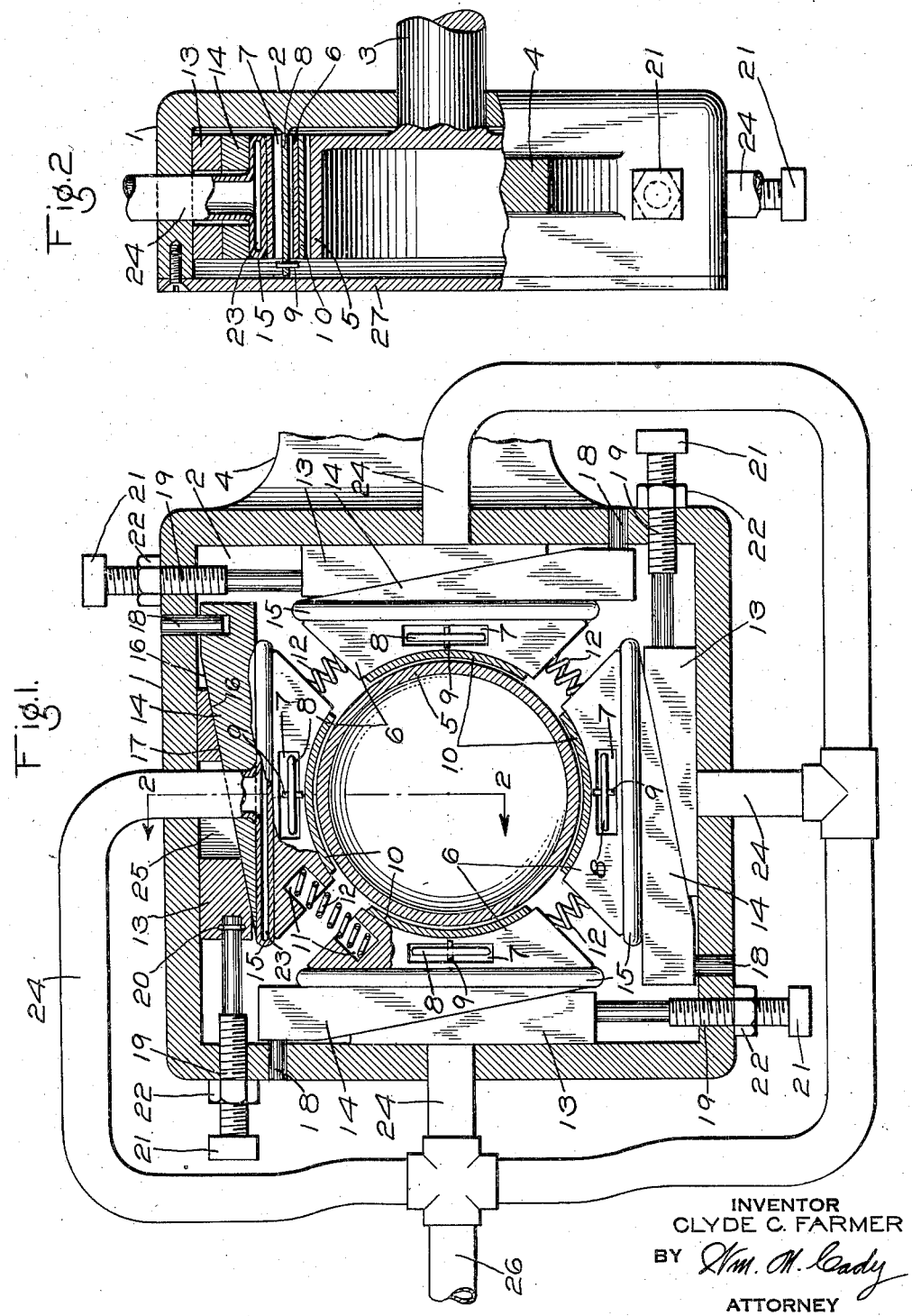
INVENTOR
CLYDE C. FARMER
BY *Wm. W. Cady*
ATTORNEY Patented Apr. 26, 1938

2,115,551

UNITED STATES PATENT OFFICE 2,115,551

FLUID PRESSURE BRAKE

Clyde C. Farmer, Pittsburgh, Pa., assignor to The Westinghouse Air Brake Company, Wilmerding, Pa., a corporation of Pennsylvania Application September 14, 1935, Serial No. 40,611

7 Claims. (Cl. 188—152)

This invention relates to fluid pressure brakes and more particularly to the type in which pneumatic or hydraulic pressure is adapted to be applied to brake shoes for pressing the brake shoes against a member to be braked.

One object of the invention is to provide an improved brake system of the above type in which a relatively low actuating pressure will produce a relatively high braking effect.

A more specific object of the invention is to provide an improved brake system of the above type having a plurality of closely spaced, radially movable brake shoes arranged around a brake drum or the like and movable by pressure applied uniformly over the area of one side into frictional engagement with the drum for braking the drum, the combined length of the braking surfaces on the shoes being equal to the major portion of the circumference of the drum, and the area which is subjected to pressure for pressing the shoe against the drum is greater than the area of the drum engaging surface of the shoe, whereby a relatively low unit pressure applied to the shoe will produce a relatively high unit pressure against the drum.

Another object of the invention is to provide an improved braking mechanism such as just defined in which the width of the area to which pressure is applied is no greater than that of the braking surface of the shoe or than that of the drum.

A still further object of the invention is to provide in a brake mechanism of the above type in which a flexible diaphragm like tube is employed as the medium for applying pressure to each of the brake shoes, a relatively simple system for adjusting the normal clearance space between the braking surface of the brake shoes and the member to be braked, and for thereby limiting the expansion of the diaphragm like tube in moving the brake shoes into braking engagement with said member, and further for equalizing said clearance space and diaphragm travel for the several brake shoes and diaphragms.

Other objects and advantages will be apparent from the following more detailed description of the invention.

In the accompanying drawing; Fig. 1 is a cross-sectional view, with certain parts shown in outline, of a braking mechanism embodying the invention; and Fig. 2 is in part a side elevational view of the mechanism shown in Fig. 1, and in part a sectional view taken on the line 2—2 of Fig. 1.

As shown in the drawing, the braking mechanism comprises a four sided, box-like housing 1, the sides of the housing projecting from a back plate 2 which is journaled on an axle 3 adapted to be braked. An arm 4 projects from one of the sides of the housing and is adapted to be secured to any stationary part of a vehicle for holding the housing 1 against rotation with the axle 3.

A brake drum 5 is disposed within the housing 1 and is secured to the end of axle 3 so as to turn with the axle. Four equally spaced brake shoes 6 are disposed within the housing 1 around the drum 5 and concentric with said drum. Each of these brake shoes is provided with an opening 7 through which a lug 8 extends, the lug 8 being secured to the back plate 2. The thickness of the lug 8 is such with respect to the width of the openings 7 through the shoes as to permit free radial movement of the shoes relative to the drum 5, while the width of the lugs is such with respect to the opening 7 as to prevent appreciable movement of the shoes in the direction of rotation of the drum 5. The shoes 6 may be held in place on their respective lugs in any suitable manner, such for instance, as by keys 9 which may be secured to said lugs by being driven into suitable openings or in any other desired manner.

The inner surface of the brake shoes is shaped to conform to the outside diameter of the brake drum 2, and secured to this surface is a brake lining 10 adapted to frictionally engage the outer periphery of said drum.

The end faces of the brake shoes are substantially parallel and extend substantially radially of the drum. In both of these end faces is provided a pocket 11, the pocket 11 in one shoe being opposite the pocket on the adjacent end of the adjacent shoe. A spring 12 is provided between the adjacent ends of each two shoes with one end in the pocket 11 in one shoe and the other end in the pocket 11 in the adjacent shoe. The several springs 12 are under compression and coact to urge the several shoes outwardly on their respective lugs 8 and thus away from the brake drum 5.

A flexible tube-like diaphragm 15, to be hereinafter described, engages the pressure receiving face of each shoe 6 and a pair of oppositely disposed coacting wedges 13 and 14 are disposed between each shoe and the casing for limiting the extent of outward movement of the shoes, and thereby the clearance space between the brake drum 5 and the brake lining 10, due to the action of springs 12.

Each of the wedges 13 has one face in engagement with the casing 1 and has an opposite and inclined face 16, while each of the wedges 14 has one face in engagement with its respective diaphragm 15 and an opposite and inclined face 17 adapted to slidably engage the face 16 on the coacting wedge 13.

One end of each of the wedges 14 is provided with a bore which freely receives a pin 18 secured in the casing 1, so that the pin acts to prevent movement of the wedges 14 relative to the casing except in a direction toward the brake drum 5.

An adjusting screw 19 is provided for each of the wedges 13 for individually moving said wedges relative to the casing and the coacting wedge 14. Each of the adjusting screws 19 extends through a suitable opening in the casing and has screw-threaded engagement therewith. Inside of the casing, each of the screws extends into a bore in one end of the respective wedge 13. In this bore the end of the respective screw is pivotally connected to the wedge 13 by a snap ring 20. Each of the adjusting screws 19 is provided outside of the casing with a head 21 for receiving a wrench or the like, and a lock nut 22 adapted to engage the casing for locking the screw in an adjusted position.

The diaphragms 15 are preferably made of metal and are normally in the form of a flattened expansible tube closed at both ends and thereby forming a fluid receiving chamber 23 which is open to a pipe 24. The pipe 24 extends through a suitable opening in the wedge 14 and an elongated slot 25 in the wedge 13. The several pipes 24 connecting to the several diaphragm chambers 23 are all connected outside of the casing 1 to a common pipe 26 through which fluid under pressure is adapted to be supplied to and released from said chambers.

In operation, in order to apply the brake shoes 6 to the drum 5 for braking the axle 3, fluid under pressure is supplied to pipe 26 and from thence flows through the several pipes 24 to chamber 23 inside each of the diaphragms 15. The pressure of fluid obtained in the chambers 23 acts to simultaneously expand the diaphragms 15 between the inner wedges 14 and the brake shoes 6. Since the wedges 14 are fixed with respect to the casing, the expansion of the diaphragms 15 moves the shoes 6 into frictional engagement with the brake drum 5 and exerts thereon a retarding force proportional to that applied in chamber 23.

In order to release the brake shoes 6 from the brake drum 5, fluid under pressure is released from pipe 26 and thereby from diaphragm chambers 23 through the pipes 24. This permits the diaphragms 15 to contract and thereby return to their original or normal form which in turn permits the springs 12 to force the shoes 6 apart and thus move said shoes out of braking engagement with the drum 5.

It will be noted that the area of the face of the brake shoes 6 which is engaged by the diaphragms 15 is greater than the area of the brake shoe lining 10 which is adapted to engage the drum 5, and it will be further noted that the combined areas of the surface of the several shoes engaged by the several diaphragms is greater than the area of the exterior surface of the drum, so that a relatively low unit pressure applied to the shoes by the diaphragms will produce relative high unit pressure between the shoes and drum. This is very desirable in that it permits the use of relatively low fluid pressures in the diaphragms which reduces the possibility of diaphragm rupture and provides for longer diaphragm life.

It should be further noted that the face of the brake shoes engaged by the diaphragms is no greater in width than that of the drum or brake lining on the shoes, and that the greater shoe area for engagement with the diaphragms is obtained by mounting the brake shoes around the exterior of the drum. Furthermore, the shoes are of such length as to engage the major portion of the periphery of the drum and this provides a system in which relatively low shoe pressures against the drum will provide a relatively high retarding effect on the drum.

It will be noted that in releasing the brakes, the springs 12 cause the brake shoes 6 to follow the diaphragms 15 as they are deflated, so that the release position of the shoes is defined by the position of the wedges 13 and 14 and the normal overall thickness of the diaphragms 15 which are interposed between said wedges and the shoes. In other words the wedges 13 and 14 and the thickness of diaphragm 15 define the clearance space between the shoe lining 10 and the brake drum 5.

It is desirable that this clearance space be maintained within certain limits particularly in order to prevent excessive expansion and thereby over stressing of the diaphragm 15 when applying the brakes.

Wear of the brake lining 10 and drum 5 will cause an increase in this clearance space. In order to adjust this clearance space a cover 27 is removed from the casing to gain access to the drum 5 and shoes 6. The lock nuts 22 on the adjusting screws 19 are then released and the screws 19 are turned into the casing 1 which forces the wedges 13 into the space between the casing and the wedges 14. The wedges 14 are prevented from moving with the wedges 13 due to the pins 18, but the wedging action resulting from movement of wedges 13 forces the wedges 14, diaphragms 15 and brake shoes 6 inwardly toward the brake drum 5. A feeler gauge or the like may be used to determine the clearance between the brake drum and brake lining, and when the shoes 6 are forced inwardly sufficiently to obtain the desired clearance, then the lock nuts 22 are turned against the casing to lock the screws 19 and thereby wedges 13 and 14, diaphragms 15 and shoes 6 in their adjusted position, after which the cover 27 is again applied to the casing.

It will be evident that each shoe 6 is adapted to be individually adjusted by means of one of the screws 19 and one set of wedges 13 and 14, so that if for any reason the clearance of one shoe, prior to adjustment, should be different from that of another shoe, all shoes may be adjusted to provide the same clearance space.

It should be noted that by using the wedges 13 and 14 for adjusting purposes, and permitting the wedges 14 to move only in a direction radially of the brake drum, the shoes are maintained in the proper concentric relation with the drum, and the diaphragms 15 are not distorted in any way during the adjusting process.

In order to apply new shoes when desired, the cover plate 27 is removed from the casing 1 and the adjusting screws 19 are backed out of said casing. This pulls the wedges 13 away from the wedges 14 and permits the pressure of springs 12 to urge the brake shoes 6, diaphragms 15 and wedges 14 outwardly. The screws 19 may be thus released until the thicker end of wedge 14 engages the casing. The keys 9 are removed from the ends of the lugs 8 and then the shoes 6 are pulled off of said lugs. New shoes or reconditioned shoes are then applied to the lugs with the springs 12 properly positioned in the ends of the shoes. The keys 9 are then reapplied and the brake shoe clearance adjusted as hereinbefore described following which the cover plate 27 is again secured to the casing.

While in the description of operation fluid under pressure has been referred to as the brake control medium, it will be evident that this control may be either in the form of a compressed gas or a column of liquid to which pressure may be applied.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, in combination, a casing, a rotatable braking drum in said casing, a braking element adapted to frictionally engage said drum, an expansible tube engaging said element and operable upon supplying fluid under pressure to said tube to press said element into engagement with said drum, means for adjusting the normal clearance space between said element and drum, and means carried by said casing oprable to lock said adjusting means and thereby said element in an adjusted position.

2. In a fluid pressure brake, in combination, a casing, a rotatable brake drum in said casing, a braking element adapted to frictionally engage said drum, an expansible tube engaging said element and operable by fluid under pressure to press said element into frictional engagement with said drum, means interposed between said casing and said tube for adjusting the normal clearance space between said element and said drum, and means for locking the adjusting means to said casing for thereby securing said braking element in an adjusted position.

3. In a fluid pressure brake, in combination, a casing, a rotatable brake drum, a braking element adapted to frictionally engage said drum, an expansible tube engaging said element and operable by fluid under pressure to press said element into frictional engagement with said drum, a pair of cooperating wedges interposed between said casing and said tube, and manually operable means for moving one wedge relative to the other, to adjust the position of said tube and element relative to said drum.

4. In a fluid pressure brake, in combination, a casing, a rotatable brake drum, a braking element adapted to frictionally engage said drum, an expansible tube engaging said element and operable by fluid under pressure to press said element into frictional engagement with said drum, a pair of cooperating movable wedges interposed between said casing and said tube, with one wedge engaging said casing and the other engaging said tube, means for moving the wedge engaging the casing relative to the other wedge for adjusting the position of said tube and element relative to said drum, and means for preventing movement of the wedge engaging said tube relative to said tube.

5. In a fluid pressure brake, in combination, a casing, a rotatable brake drum in said casing, a plurality of brake elements arranged around the exterior circumference of said drum and adapted to be moved into frictional engagement with said drum, an expansible tube engaging each element and operable by fluid under pressure for moving the corresponding element into engagement with said drum, spring means operable upon the relief of fluid under pressure from said tubes for moving said elements away from said drum, stop means for defining the extent of movement of each element by said spring means, means in said casing for adjusting said stop means and thereby the clearance space between said braking elements and drum when said tubes are relieved of fluid under pressure, and means carried by said casing for locking said adjusting means and thereby said braking elements in an adjusted position.

6. In a fluid pressure brake, in combination, a casing, a rotatable member in said casing adapted to be braked, a brake element normally spaced from said member and movable into braking engagement therewith, expansible means operative by fluid under pressure for moving said brake element into engagement with said member, means screw-threaded in said casing and operable to move said expansible means and brake element relative to said member for adjusting the distance said brake element is normally spaced from said rotatable member, and means for locking said screw-threaded means to said casing for thereby locking said brake element in an adjusted condition.

7. In a fluid pressure brake, in combination, means fixed against rotation, a rotatable member adapted to be braked, a brake element normally spaced from said member and movable into braking engagement therewith, adjustable means, expansible means, said adjustable means and expansible means being disposed between said brake element and the fixed means in engagement with each other and with one engaging said brake element and the other engaging said fixed means, said expansible means being operative by fluid under pressure to move said brake element into engagement with said member, resilient means for moving said brake element away from said member upon contraction of said expansible means, and means for operating said adjustable means to adjust the distance said resilient means moves said brake element away from said brake member.

CLYDE C. FARMER.

CERTIFICATE OF CORRECTION.

Patent No. 2,115,551.  April 26, 1938.

CLYDE C. FARMER.

It is hereby certified that error appears in the printed specification of the above numbered patent requiring correction as follows: Page 3, second column, line 18, claim 5, after "means" insert the words in said casing; and that the said Letters Patent should be read with this correction therein that the same may conform to the record of the case in the Patent Office.

Signed and sealed this 26th day of September, A. D. 1939.

(Seal)

Henry Van Arsdale,
Acting Commissioner of Patents.